United States Patent
Raber

(10) Patent No.: US 12,271,467 B2
(45) Date of Patent: *Apr. 8, 2025

(54) AUTOMATED GENERATION OF A SANDBOX CONFIGURATION FOR MALWARE DETECTION

(71) Applicant: Malwarebytes Corporate Holdco Inc., Santa Clara, CA (US)

(72) Inventor: Jason Neal Raber, Bellbrook, OH (US)

(73) Assignee: Malwarebytes Corporate Holdco Inc., Santa Clara, CA (US)

( * ) Notice: Subject to any disclaimer, the term of this patent is extended or adjusted under 35 U.S.C. 154(b) by 87 days.

This patent is subject to a terminal disclaimer.

(21) Appl. No.: 17/562,679

(22) Filed: Dec. 27, 2021

(65) Prior Publication Data

US 2022/0138314 A1    May 5, 2022

Related U.S. Application Data

(63) Continuation of application No. 17/089,507, filed on Nov. 4, 2020, now Pat. No. 11,232,193.

(51) Int. Cl.
*G06F 21/53* (2013.01)
*G06F 9/445* (2018.01)
(Continued)

(52) U.S. Cl.
CPC .......... *G06F 21/53* (2013.01); *G06F 9/44521* (2013.01); *G06F 9/54* (2013.01); *G06F 21/566* (2013.01); *G06F 2221/033* (2013.01)

(58) Field of Classification Search
CPC ........ G06F 21/53; G06F 9/44521; G06F 9/54; G06F 21/566; G06F 2221/033
(Continued)

(56) References Cited

U.S. PATENT DOCUMENTS

| 11,232,193 | B1* | 1/2022 | Raber | G06F 9/54 |
| 2002/0065948 | A1* | 5/2002 | Morris | G06F 11/3466 |
| | | | | 714/E11.2 |

(Continued)

OTHER PUBLICATIONS

Jiang, "Stealthy Malware Detection Through VMM-Based", Nov. 2007, ACM, pp. 1-12 (Year: 2007).*

(Continued)

*Primary Examiner* — Taghi T Arani
*Assistant Examiner* — Gregory A Lane
(74) *Attorney, Agent, or Firm* — Fenwick & West LLP

(57) ABSTRACT

A method that automatically generates blacklists for a sandbox application. The method first obtains a set of disassembled operating system (OS) dynamic-link libraries (DLLs) and then identifies application programming interfaces (API) functions that have respective kernel interruptions. The identified API functions that have kernel instructions are saved to an interrupt list. Based on the interrupt list, a processor generates a blacklist that includes for each of the DLLs, the identified API functions in the interrupt list, all API functions that directly or indirectly invoke one of the identified API functions in the interrupt list via one or more nested API functions. The method outputs the blacklist to the sandbox application that operates on a sample file to emulate API functions of the sample file that match the blacklist. All other APIs not identified as being blacklisted, are then considered whitelisted and are allowed to run natively.

20 Claims, 3 Drawing Sheets

(51) Int. Cl.
*G06F 9/54* (2006.01)
*G06F 21/56* (2013.01)

(58) Field of Classification Search
USPC .......................................................... 726/23
See application file for complete search history.

(56) References Cited

U.S. PATENT DOCUMENTS

| | | | |
|---|---|---|---|
| 2008/0276102 A1* | 11/2008 | MacKay | G06F 21/577 713/193 |
| 2010/0333203 A1 | 12/2010 | Tsviatkou et al. | |
| 2017/0032122 A1 | 2/2017 | Thakar et al. | |
| 2018/0181451 A1 | 6/2018 | Saxena et al. | |
| 2018/0330010 A1* | 11/2018 | Seki | G05B 15/02 |
| 2019/0303574 A1 | 10/2019 | Lamay et al. | |
| 2023/0188832 A1* | 6/2023 | Xu | G06T 19/006 348/333.01 |

OTHER PUBLICATIONS

Kang, "Detecting and Classifying Android Malware and Using Static Analysis along with Creator Information", 2015, International Journal of Distributed Sensor Networks, pp. 1-9 (Year: 2015).*
Srivastava, A. et al., "Efficient Monitoring of Untrusted Kernel-Mode Execution", Proceedings of the Network and Distributed System Security Symposium, NDSS, Jan. 2011, pp. 1-18.
United States Office Action, U.S. Appl. No. 17/089,507, May 19, 2021, 28 pages.
United States Office Action, U.S. Appl. No. 17/089,507, Jan. 7, 2021, 25 pages.

* cited by examiner

AUTOMATED GENERATION OF A SANDBOX CONFIGURATION FOR MALWARE DETECTION

CROSS REFERENCE TO RELATED APPLICATIONS

This application is a continuation of U.S. Non-Provisional application Ser. No. 17/089,507, filed Nov. 4, 2020, which is incorporated by reference.

FIELD OF ART

The present disclosure generally relates to malware detection and more specifically to automating classification of API functions for efficient malware detection.

BACKGROUND

A sandbox is an application for emulating execution of a suspicious computer program in a secure and isolated computing environment. Sandboxes may be utilized as a component of a malware detection application to monitor behavior of the suspicious program and determine if it is malicious prior to letting it execute in the native environment. A challenge with using sandboxes is that emulation is computationally intensive. Thus, it is generally not practical or desirable to emulate every instruction of all suspicious programs.

SUMMARY

A method automatically generates blacklisted APIs for a sandbox application. The method first obtains a set of disassembled operating system dynamic-link libraries (DLLs) and then identifies, in the disassembled DLLs, application programming interfaces (API) functions that have respective kernel interrupt instructions. The identified API functions that have kernel interrupt instructions are stored to an interrupt list. Based on the interrupt list, a processor generates a blacklist that includes for each of the DLLs, the identified API functions in the interrupt list, all API functions that directly invoke one of the identified API functions in the interrupt list, and all API functions that indirectly invoke one of the identified API functions in the interrupt list via one or more nested API functions. The method outputs the blacklist to the sandbox application that operates on a sample file to emulate API functions of the sample file that match the blacklist.

In another embodiment, a non-transitory computer-readable storage medium stores instructions that when executed by a processor causes the processor to execute the above-described method.

In yet another embodiment, a computer system includes a processor and a non-transitory computer-readable storage medium that stores instructions for executing the above-described method.

BRIEF DESCRIPTION OF THE DRAWINGS

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
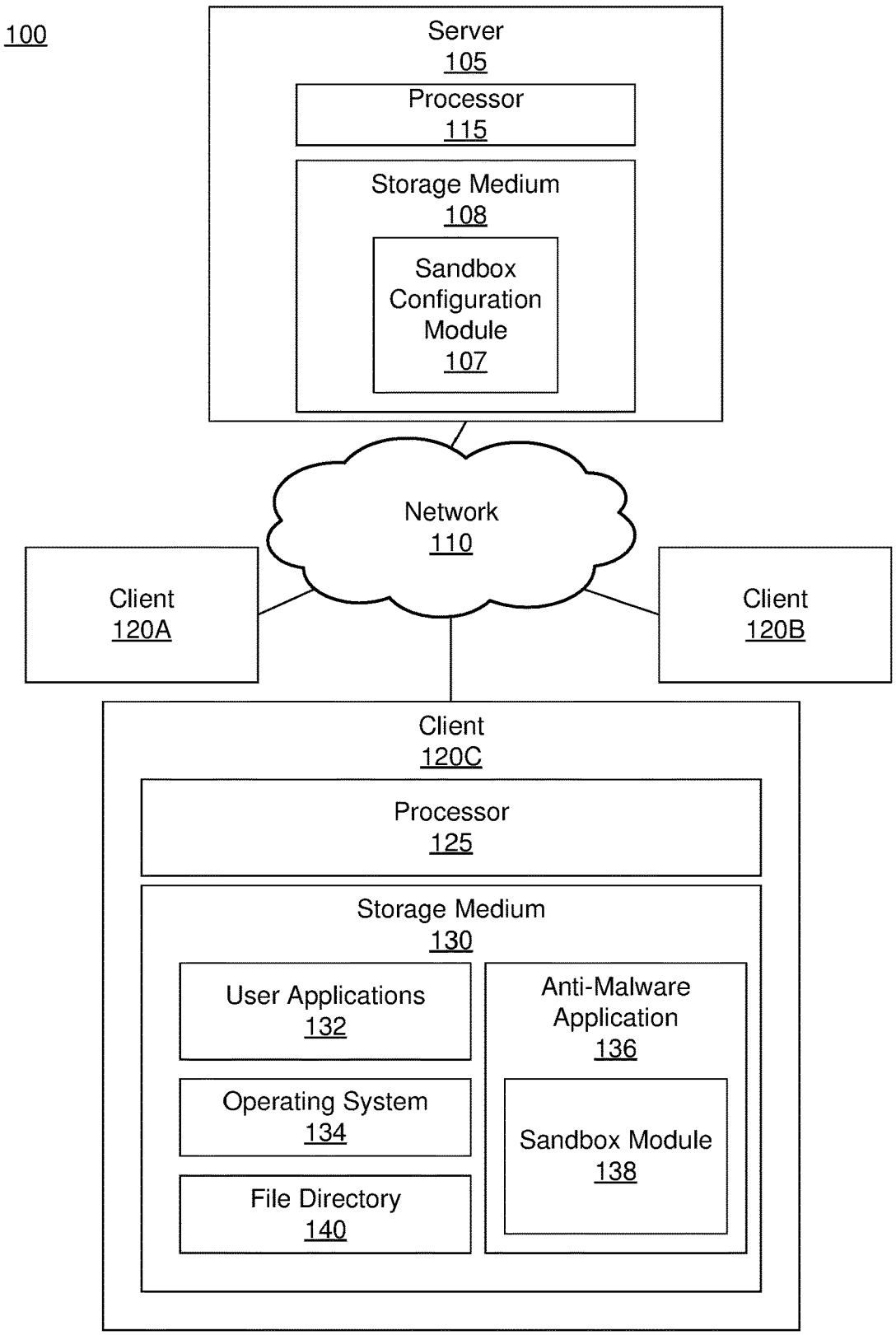
FIG. 1 is a system diagram illustrating an example embodiment of a computing environment including clients, a server, and a network.

FIG. 1 is a system diagram illustrating an example embodiment of a system environment 100 comprising a server 105, a network 110, and clients 120A, 120B and 120C, which are collectively referenced herein as clients 120. For simplicity and clarity, only one server 105 and a limited number of clients 120 are shown. However, other embodiments may include different numbers of servers 105 and clients 120. The system environment 100 may also include different or additional entities.

The network 110 represents the communication pathways between the server 105 and clients 120. In one embodiment, the network 110 is the Internet. The network 110 may also utilize dedicated or private communications links that are not necessarily part of the Internet such as local area networks (LAN). In one embodiment, the network 110 uses standard communications technologies and/or protocols.

Each client 120 comprises one or more computing devices capable of processing data as well as transmitting and receiving data via the network 110. For example, a client device 120 may be a desktop computer, a laptop computer, a smart phone, a tablet computing device, an Internet of Things (IoT) device, or any other device having computing and data communication capabilities. Each client 120 includes a processor 125 for manipulating and processing data, and a storage medium 130 for storing data and program instructions associated with various applications. The storage medium 130 may include both volatile memory (e.g., random access memory) and non-volatile storage memory such as hard disks, flash memory, flash drives, external memory storage devices, USB drives, discs and the like. In addition to storing program instructions, the storage medium 130 stores various data associated with operation of the client device 120.

In one embodiment, the storage medium 130 comprises a non-transitory computer-readable storage medium that stores a file directory 140 and various executable programs including an operating system 134, anti-malware application 136, and user applications 132 that are each embodied as computer-executable instructions stored to the non-transitory computer-readable storage medium. The instructions, when executed by the processor 125, cause the clients 120 to perform the functions attributed to the programs described herein.

The operating system 134 is a specialized program that manages computer hardware resources of the clients 120 and provides common services to the user applications 132. For example, a computer's operating system 134 may manage the processor 125, storage medium 130, or other components not illustrated such as a graphics adapter, an audio adapter, network connections, disc drives, and USB slots. A cell phone's operating system 134 may manage the processor 125, storage medium 130, display screen, keypad, dialer, wireless network connections and the like. Because many programs and executing processes compete for the limited resources provided by the processor 125, the operating system 134 may manage the processor bandwidth and timing to each requesting process. Examples of operating systems 134 include WINDOWS, MAC OS, IOS, LINUX, UBUNTU, UNIX, and ANDROID.

The user applications 132 may include applications for performing a particular set of functions, tasks, or activities for the benefit of the user. Examples of user applications 132 may include a word processor, a spreadsheet application, and a web browser. In some cases, a user application 132 may be a source of malware that is unknowingly hidden in the user application 132. The malware may infect the client 120 when the user application 132 is installed or executed.

The file directory 140 stores files. Files may include system files associated with operation of the operating system 134, the user applications 132, or the anti-malware application 136. The files may further include user files that may be created or modified by users. Examples of user files may include image files, video files, word processor documents, spreadsheet documents, and drawing files. User files are generally highly valuable to the users because they may be personal in nature and may be difficult or impossible to recover or replace if compromised. As a result, certain types of malware such as ransomware may target user files.

An anti-malware application 136 detects, stops, and removes malware. The anti-malware application 136 may prevent new malware from being installed on a client 120 or remove or disable existing malware that is already present on the client 120. The anti-malware application 136 may determine if a process is malware based on behaviors indicative of malware, based on static analysis of a file, based on emulation of a program using the sandbox module 138 described in further detail below, or based on a combination of factors. In one embodiment, the anti-malware application 136 may store and/or download from the network 110, malware definitions that specify characteristics or behaviors of malware that the anti-malware application 136 seeks to detect. The anti-malware application 136 may also extract and send data to the server 105 for classification instead of performing detection locally. The server 105 may receive the data, perform analysis and classification and send data and instructions back to the anti-malware application 136 to enable the client 120 to identify and stop malicious activities.

The anti-malware application 136 includes a sandbox module 138. The sandbox module 138 is an application for emulating and monitoring behavior of a sample file (e.g., a suspicious program) in an isolated and secure environment. The sandbox module 138 operates by hooking API functions of the sample file and executing the instructions in a virtual environment that is isolated from the native environment of the operating system 134. To preserve computing resources, the sandbox module 138 is generally configured to emulate only a limited set of API functions of a sample file that are deemed untrusted (i.e., blacklisted). Other API functions that are trusted (i.e., whitelisted) may instead be executed natively on the operating system 134. The sandbox module 138 may obtain a sandbox configuration including a blacklist of untrusted API function and a whitelist of trusted API functions. The sandbox configuration may be received from the sandbox configuration module 107 of the server 105 described below.

The server 105 is a computer system configured to store, receive, and transmit data to client devices 120 via the network 110. The server 105 may include a singular computing system, such as a single computer, or a network of computing systems, such as a data center or a distributed computing system. In one embodiment, the server 105 includes a processor 115 for manipulating and processing data, and a storage medium 108 for storing data and program instructions associated with various applications. The storage medium 108 may include both volatile memory (e.g., random access memory) and non-volatile storage memory such as hard disks, flash memory, flash drives, external memory storage devices, USB drives, discs and the like. The server 105 may receive data from the clients 120 and may also send data to the clients.

The storage medium 108 includes a sandbox configuration module 107. The sandbox configuration module 107 performs various configuration tasks including automatically identifying and classifying API functions into a blacklist and a whitelist for applying by the sandbox module 138. The sandbox configuration including the blacklist and whitelist may be sent to the clients 120 to configure the respective sandbox modules 138. The sandbox configuration module 107 is discussed in further detail in FIG. 2 below.

Figure 2:
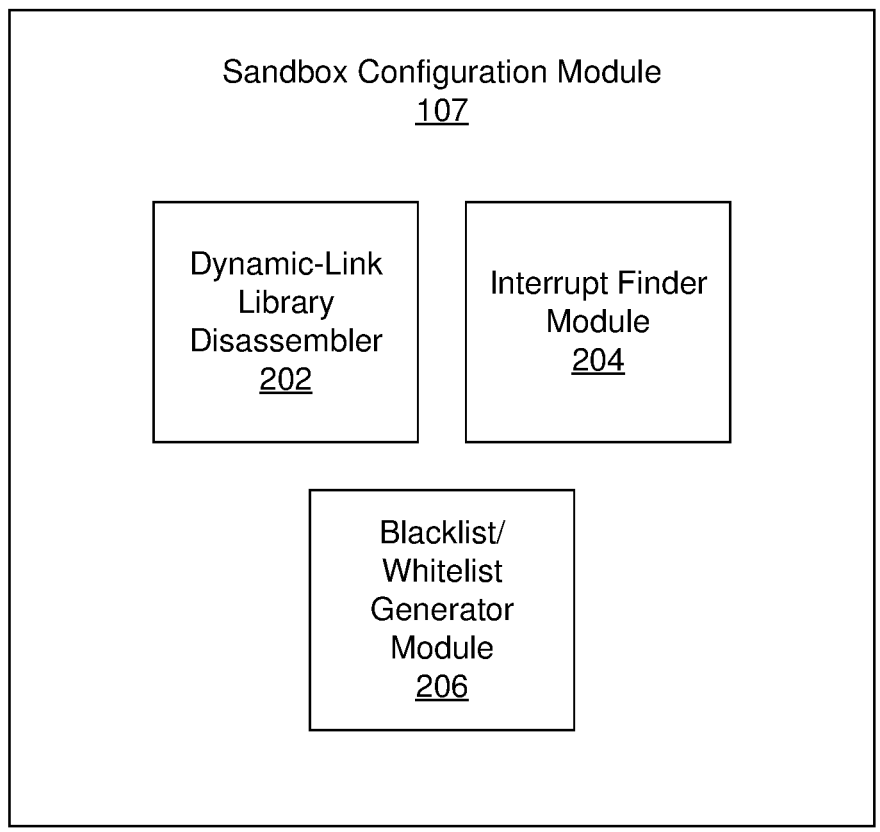
FIG. 2 is a block diagram illustrating an example embodiment of a sandbox configuration module of the server.

FIG. 2 illustrates an example embodiment of sandbox configuration module 107 of the server 105. The sandbox configuration module 107 includes a dynamic-link library (DLL) disassembler 202, an interrupt finder module 204 and a blacklist/whitelist generator module 206. Alternative embodiments may include different or additional modules or omit one or more of the illustrated modules.

The DLL disassembler 202 disassembles selected DLLs to assembly code. For example, the DLL dissembler 202 may traverse a system directory (e.g., C:\Windows\SysWOW64) of a computer system representative of the clients 120 and identify files having the extension ".dll" in its file name (e.g., kernel32.dll, ntdll.dll, etc.), or otherwise identify files having characteristics of a DLL. The DLL disassembler 202 then disassembles each of the DLLs within the directory. The output from the DLL disassembler 202 may be a file or multiple files containing assembly code. The assembly code for each disassembled DLL includes a sequence of API function calls that can be invoked by an application or other DLLS.

The interrupt finder module 204 finds API functions in the disassembled DLLs that invoke a kernel interrupt. Because any function call that invokes a kernel interrupt aims to communicate with the kernel directly, its presence in an API function is a strong indicator that the API function is capable of invoking potentially malicious behavior. Therefore, API functions that cause interrupts are flagged for emulation. The interrupt finder module 204 may scan through the outputted assembly files from the DLL disassembler 202 and search for API functions that invoke a kernel interrupt. For example, in the Windows system environment, any API function containing assembly instructions containing "large dword ptr fs:0C0h" or other predefined syntax are identified as causing a kernel interrupt when the API is executed. For each disassembled DLL, the interrupt finder module 204 generates a list of API functions that contain an assembly instruction invoking kernel interrupt. The interrupt finder module 204 may optionally concatenate each individual list of the identified API functions from multiple DLLs into a concatenated list. The interrupt finder module 204 may store a separate whitelist of identified API functions from the disassembled DLLs that do not directly invoke a kernel interrupt.

The blacklist/whitelist generator module 206 generates a blacklist with all API functions that directly or indirectly invoke a kernel interrupt and whitelist of all remaining identified API functions that neither directly nor indirectly invoke a kernel interrupt. In an embodiment, the blacklist/whitelist generator module 206 identifies the blacklist and whitelist according to an iterative process that recursively searches the identified API functions and updates the blacklist and whitelist at each iteration. In a particular process, the blacklist/whitelist generator module 206 may first store the concatenated list of API functions generated by the interrupt finder module 204 as a preliminary blacklist and store all other API functions (that do not directly invoke a kernel interrupt) to a preliminary whitelist. The blacklist/whitelist generator module 206 then searches the API functions on the preliminary whitelist to identify API functions that invokes any of the API functions on the blacklist (and therefore indirectly may invoke a kernel interrupt). The identified API functions are moved from the whitelist to the blacklist. The process then repeats in a recursive manner to identify additional API functions that indirectly invoke a kernel interrupt via a nested function until it is verified that none of the API functions on the whitelist call any of the API functions on the blacklist. The blacklist/whitelist generator module 206 then outputs a blacklist with all the API functions that directly or indirectly invoke kernel interrupts. The blacklist/whitelist generator module 206 may also output a whitelist that includes the remaining API functions that are not on the blacklist. The server 105 may send the blacklist and the whitelist to clients 120 through network 110 for configuring the sandbox module 138.

Figure 3:
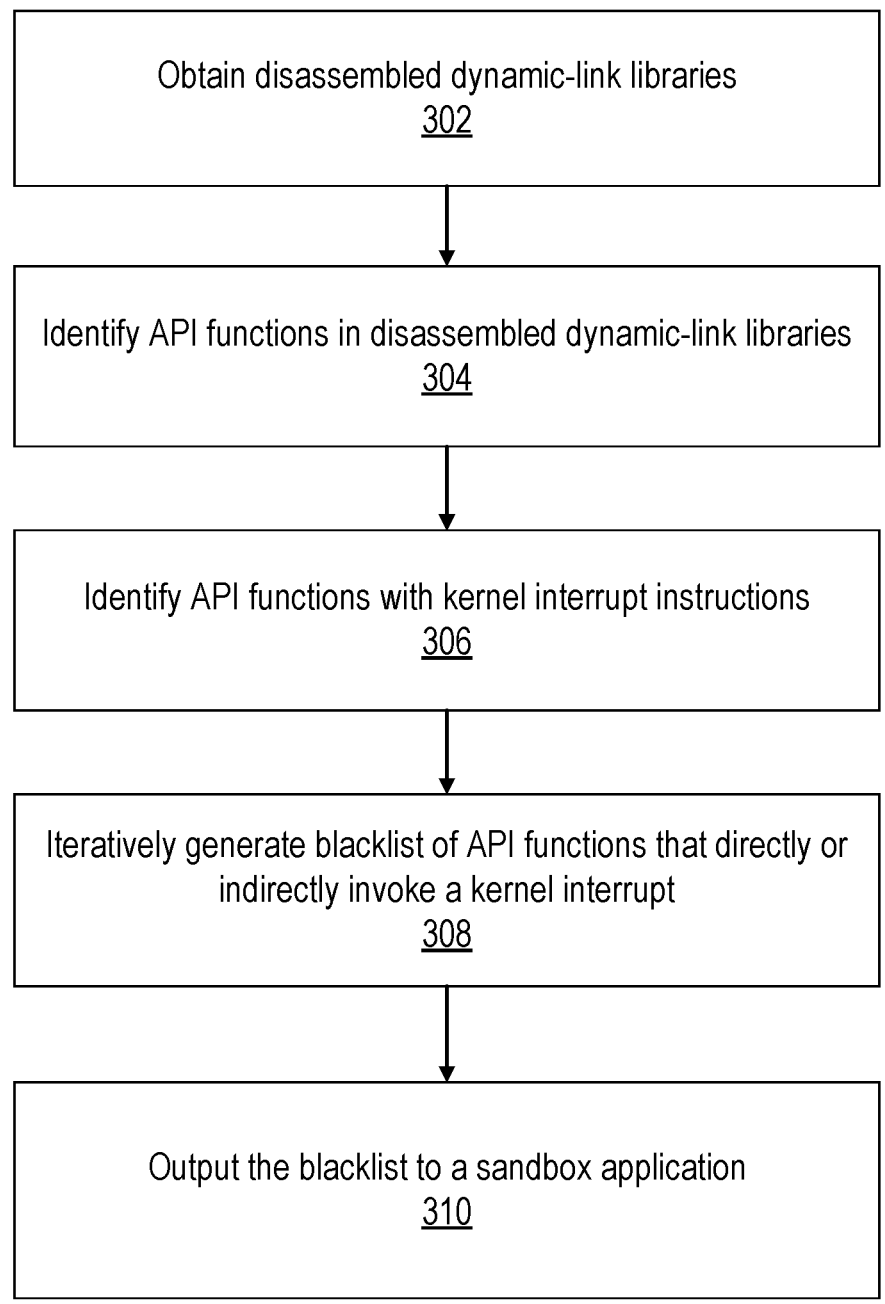
FIG. 3 is a flowchart illustrating an embodiment of a process for identifying API functions for emulation in sandbox.

FIG. 3 is a flowchart illustrating an embodiment of a process for identifying API functions for emulation in sandbox module 138. The interrupt finder module 204 obtains 302 the disassembled DLLs from the DLL disassembler 202 and identifies 304 API functions. The interrupt finder module 204 furthermore identifies 306 API functions containing kernel interrupt instructions. The blacklist/whitelist generator module 206 generates 308 a blacklist of API functions that directly or indirectly invoke a kernel interrupt via a nested API function. Here, the blacklist/whitelist generator 206 may execute an iterative process as described above. The iterative process stops when all the API functions are classified such that none of the API functions outside the blacklist invokes an API function on the blacklist. Then the sandbox configuration module 107 outputs 310 the blacklist to a sandbox module 138 which operates on a sample file. The sandbox configuration 107 may also output a whitelist of remaining identified API functions that are not on the blacklist. The sandbox module 138 emulates API functions of the sample file that are on the blacklist and natively executes API functions on the whitelist via the operating system 134.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for analyzing a sample file in a sandbox application, the method comprising:
obtaining, at the sandbox application, a blacklist of API functions, wherein the blacklist was generated by a process including:
identifying, based on operating system disassembled dynamic-link libraires, a set of API functions that causes kernel interrupts;
storing the set of API functions having instructions that cause kernel interrupts to an interrupt list;
identifying a plurality of API functions for the blacklist by:

selecting, for the blacklist, at least one API function that directly invokes one of the set of API functions,
selecting, for the blacklist, at least one API function that indirectly invokes one of the set of API functions,
selecting, for the blacklist, at least one API function that invokes one of the set of API functions via one or more nested API functions, and
iteratively selecting, for the blacklist, at least one API function not on the blacklist that calls one of the API functions on the blacklist;
forming the blacklist from the identified plurality of API functions; and
analyzing the sample file in the sandbox application by emulating API functions of the sample file that match the blacklist.

2. The method of claim 1, wherein identifying the set of API functions that causes kernel interrupts comprises:
identifying an initial set of exported system API functions in a set of disassembled operating system dynamic-link libraries that each invokes one of the identified API functions in the set of API functions in the interrupt list.

3. The method of claim 2, wherein the process further comprises:
detecting that all API functions in the set of disassembled operating system dynamic-link libraries are either on the blacklist or do not call one of the API functions on the blacklist; and
stopping identifying additional API functions in the set of disassembled operating system dynamic-link libraries.

4. The method of claim 2, wherein the process further comprises:
identifying API functions in the set of disassembled operating system dynamic-link libraries that are not on the blacklist;
storing the API functions that are not on the blacklist to a whitelist; and
outputting the whitelist to the sandbox application.

5. The method of claim 4, wherein the sandbox application natively executes API functions invoked by the sample file that match the whitelist.

6. The method of claim 1, wherein storing the identified set of API functions to the interrupt list comprises:
storing, for each of a set of disassembled operating system dynamic-link libraries, respective partial lists; and
concatenating the partial lists into the interrupt list.

7. The method of claim 1, wherein identifying the set of API functions that causes kernel interrupts comprises:
identifying the set of API functions that include instructions matching a predefined syntax associated with the kernel interrupts.

8. A non-transitory computer readable storage medium storing instructions for analyzing a sample file in a sandbox application, the instructions when executed by one or more processors causing the one or more processors to perform steps comprising:
obtaining a blacklist of API functions, wherein the blacklist was generated by a process including:
identifying, based on operating system disassembled dynamic-link libraires, a set of API functions that causes kernel interrupts;
storing the set of API functions having instructions that cause kernel interrupts to an interrupt list;
identifying a plurality of API functions for the blacklist by:
selecting, for the blacklist, at least one API function that directly invokes one of the set of API functions,
selecting, for the blacklist, at least one API function that indirectly invokes one of the set of API functions,
selecting, for the blacklist, at least one API function that invokes one of the set of API functions via one or more nested API functions, and
iteratively selecting, for the blacklist, at least one API function not on the blacklist that calls one of the API functions on the blacklist;
forming the blacklist from the identified plurality of API functions; and
analyzing the sample file in the sandbox application by emulating API functions of the sample file that match the blacklist.

9. The non-transitory computer readable storage medium of claim 8, wherein identifying the set of API functions that causes kernel interrupts comprises:
identifying an initial set of exported system API functions in a set of disassembled operating system dynamic-link libraries that each invokes one of the identified API functions in the set of API functions in the interrupt list.

10. The non-transitory computer readable storage medium of claim 9, wherein the process further comprises:
detecting that all API functions in the set of disassembled operating system dynamic-link libraries are either on the blacklist or do not call one of the API functions on the blacklist; and
stopping identifying additional API functions in the set of disassembled operating system dynamic-link libraries.

11. The non-transitory computer readable storage medium of claim 9, wherein the process further comprises:
identifying API functions in the set of disassembled operating system dynamic-link libraries that are not on the blacklist;
storing the API functions that are not on the blacklist to a whitelist; and
outputting the whitelist to the sandbox application.

12. The non-transitory computer readable storage medium of claim 11, wherein sandbox application natively executes API functions invoked by the sample file that match the whitelist.

13. The non-transitory computer readable storage medium of claim 8, wherein storing the set of API functions to an interrupt list comprises:
storing, for each of a set of disassembled operating system dynamic-link libraries, respective partial lists; and
concatenating the partial lists into the interrupt list.

14. The non-transitory computer readable storage medium of claim 8, wherein identifying the API functions that have the respective kernel interrupt functions comprises:
identifying the set of API functions that include instructions matching a predefined syntax associated with the kernel interrupts.

15. A computer system comprising:
one or more processors; and
a non-transitory computer readable storage medium storing instructions for analyzing a sample file in a sandbox application, the instructions when executed by one or more processors causing the one or more processors to perform steps comprising:
obtaining a blacklist of API functions, wherein the blacklist was generated by a process including:

identifying, based on operating system disassembled dynamic-link libraires, a set of API functions that causes kernel interrupts;

storing the set of API functions having instructions that cause kernel interrupts to an interrupt list;

identifying a plurality of API functions for the blacklist by:

selecting, for the blacklist, at least one API function that directly invokes one of the set of API functions, selecting, for the blacklist, at least one API function that indirectly invokes one of the set of API functions, selecting, for the blacklist, at least one API function that invokes one of the set of API functions via one or more nested API functions, and iteratively selecting, for the blacklist, at least one API function not on the blacklist that calls one of the API functions on the blacklist;

forming the blacklist from the identified plurality of API functions; and analyzing the sample file in the sandbox application by emulating API functions of the sample file that match the blacklist.

16. The computer system of claim 15, wherein identifying the set of API functions that causes kernel interrupts comprises:

identifying an initial set of exported system API functions in a set of disassembled operating system dynamic-link libraries that each invokes one of the identified API functions in the set of API functions in the interrupt list.

17. The computer system of claim 16, wherein the process further comprises:

detecting that all API functions in the set of disassembled operating system dynamic-link libraries are either on the blacklist or do not call one of the API functions on the blacklist; and stopping identifying additional API functions in the set of disassembled operating system dynamic-link libraries.

18. The computer system of claim 16, wherein the process further comprises:

identifying API functions in the set of disassembled operating system dynamic-link libraries that are not on the blacklist;

storing the API functions that are not on the blacklist to a whitelist; and outputting the whitelist to the sandbox application.

19. The computer system of claim 18, wherein sandbox application natively executes API functions invoked by the sample file that match the whitelist.

20. The computer system of claim 15, wherein storing the identified set of API functions to an interrupt list comprises:

storing, for each of a set of disassembled operating system dynamic-link libraries, respective partial lists; and concatenating the partial lists into the interrupt list.

* * * * *